Oct. 15, 1940. J. M. LITTLE 2,217,873

WHEEL AND SPOKE STRUCTURE

Filed Dec. 21, 1937

INVENTOR.
James M. Little
BY
Shreve, Crowe & Gordon
ATTORNEY.

Patented Oct. 15, 1940

2,217,873

UNITED STATES PATENT OFFICE 2,217,873

WHEEL AND SPOKE STRUCTURE

James M. Little, Atlanta, Ga.

Application December 21, 1937, Serial No. 181,023

2 Claims. (Cl. 152—377)

Generically this invention relates to a vehicle wheel but it more especially is directed to an adjustable spoke for tightening the tire on the wheel and effecting the expeditious removal and replacement of the tire with respect to the rim.

The removal and replacement of tires on vehicle wheels with especial reference to pneumatic tired wheels has been effected with more or less difficulty, and, therefore, one of the principal objects of this invention is the provision of co-acting adjustable spoke and rim section means for loosening and tightening the rim with respect to the tire, including means for locking the removable rim section and rim proper in tire tightened position.

With these and other objects in view, which will become apparent as the description proceeds, the invention resides in the construction, combination and arrangement of parts, hereinafter more fully described and claimed, and illustrated in the accompanying drawing, in which like characters of reference indicate like parts throughout the several figures, of which:

Figure 1:
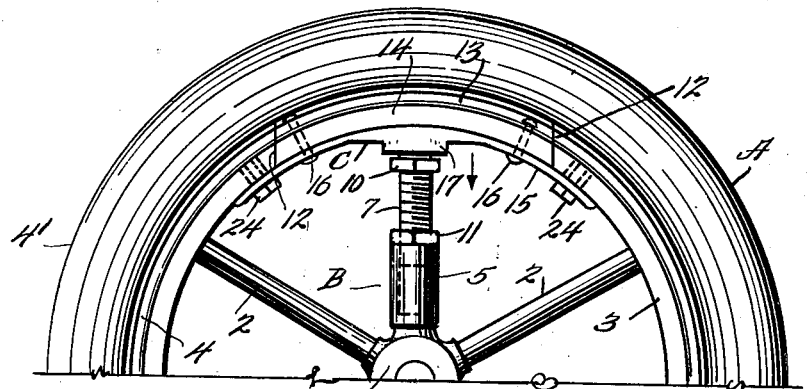
Figure 1 is a fragmentary elevation of a wheel showing the adjustable spoke and rim structure in tire-tightened or operative position.

Many efforts have been made to provide a wheel structure including means for effecting the removal and remounting of the tires of vehicle wheels and maintaining the tires thereon, but such devices with which I am familiar have proven deficient in many respects, such as requiring complex and costly wheel construction, complex means or attachments for effecting such result, and not positively locking the expansible mechanism or rim in tire-tightened position, and it was to overcome such deficiencies and to provide a simple, inexpensive and efficient structural arrangement to accomplish the desired result that I designed the adjustable spoke and co-operating removable rim section, having means for positively locking said section and the remaining rim into a unitary structure and forming the subject matter of this invention.

In the illustrated embodiment characterizing this invention there is shown an automobile wheel A comprising hub 1, spokes 2, felly 3, metal tire engaging rim 4, and pneumatic tire 4' of conventional construction.

In order to carry out the purposes of my invention, an adjustable spoke structure B is substituted for one of the spokes 2 and comprises a hollow tubular or socket section 5 integral with or suitably connected to hub 1 and formed on its inner surface with threads 6 adapted to threadedly engage in section 5. A threaded shaft section 7 is formed at its upper end with an enlarged turned or milled annular head 8 terminating in a reduced similar portion 9, and mounted on said shaft 7 adjacent to portion 9 and welded or otherwise rigidly secured thereto is the collar or nut 10 by means of which said shaft is actuated. Threadedly mounted on said shaft 7 is the locking nut 11, for a purpose hereinafter appearing.

The felly 3 and metal rim 4 are cut on the lines 12—12 forming the metal rim section 13 and felly section 14 which are mounted on the complementally curved anchor member 15, the three parts being connected into a unitary structure by, in the present instance, rivet bolts 16, and forming the removable rim section C.

Section 15 is formed central of its length with an enlarged socket portion 17 internally threaded as at 18 to receive the complementally threaded collar 19 formed with a lateral inwardly projecting flange or shoulder portion 20 extending under head 8 so that, when collar 19 is threadedly engaged in socket 17, disengagement of said head 8 will be prevented and rotatable movement of the head therein permitted, as will hereinafter more fully appear.

The ends 21 of member 15 extend beyond the ends of section C and are adapted when operatively positioned to seat on felly 3, the openings 22 formed therein being adapted to register with the threaded bores in the steel sleeves 23 suitably mounted in felly 3, and said ends are adapted to be locked to felly 3 by threaded bolts 24 extending through openings 22 and threadedly engaging in sleeves 23, as will be apparent.

It will be seen that the ends 21 when secured by bolts 24 not only lock rim section C in tire supporting position and unite the rim and section C into a unitary structure but also said ends constitute jointure reinforcing and bridging elements.

Figure 2:
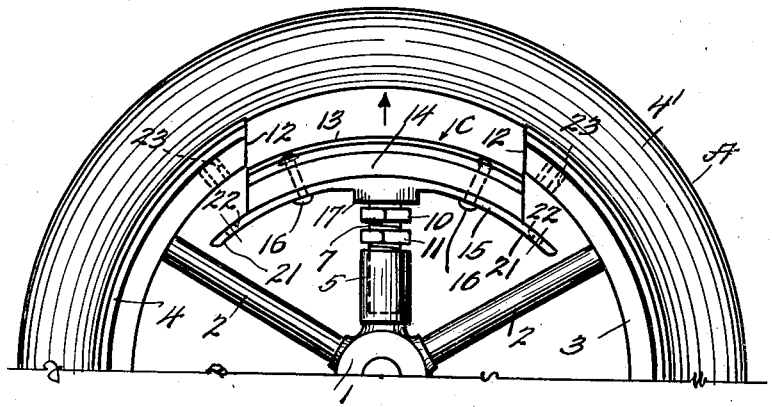
Fig. 2 is a similar view to Fig. 1 with the rim section in tire removing position.
Figure 3:
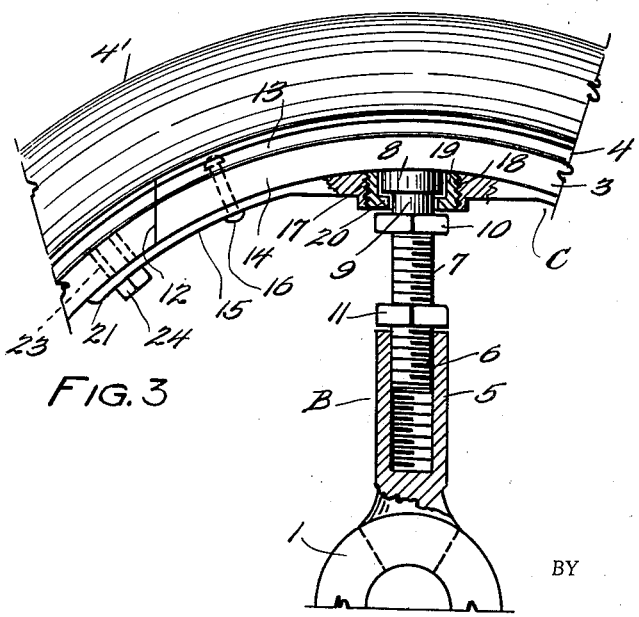
Fig. 3 is an enlarged detailed view of the tire rim and adjustable spoke structure with parts broken away and partly in elevation and partly in section.

While the operation of the device would seem to be clear from the above description yet it might be well to further state that when the shaft 7 is threadedly mounted in socket 5 and said shaft secured to section C by the threaded collar 19, said shaft may be rotated by a wrench or suitable tool applied to nut 10 moving section C to tightened or operative position as shown in Fig. 1, whereupon said section is locked in such position by threaded bolts 24 and the movement of nut 11 into engagement with the end of section 5, rigidly secures and maintains said section C in operative position. When it is desired to remove the tire all that is necessary is to disengage bolts 24, loosen end 11 and actuate shaft 7 to bring section C again into the position shown in Fig. 2, whereby the rim is loosened and the tire 4' may be easily removed.

From the above it is apparent that I have designed a vehicle wheel structure having a segmental removable rim section and cooperating adjustable spoke structure for expeditiously moving said section into tire tightening or tire loosening position, having means for rigidly locking the spoke sections in extended tire tightening and rim supporting position and for locking the movable section and remaining rim into a unitary structure, whereby a strong wheel structure is effected, and it is further apparent that I have designed a simple adjustable spoke and rim structure manufacturable at a nominal cost, simple in construction and operation and efficient for the purposes intended.

Although in practice I have found that the form of my invention illustrated in the accompanying drawing and referred to in the above description as the preferred embodiment is the most efficient and practical, yet realizing that conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A vehicle wheel including a tire supporting rim structure, a removable rim section, a hub member, an adjustable spoke structure coacting with the hub and removable section, said spoke structure including a spoke section connected at one end to the hub and a complemental spoke section swivelly connected at one end to the removable rim section so that said removable section will move as a unit with said swivelly connected spoke section, the meeting ends of said sections being adjustably interconnected, means fixedly secured to the complemental spoke section adjacent its swiveled end for effecting adjustment of said sections, and means for locking the sections in adjusted position, whereby said rim section is readily movable into and out of tire tightening position.

2. A vehicle wheel including a hub and a tire supporting rim structure, a removable rim section, an anchor member connected to and extending beyond the opposite ends of said rim section, means for removably locking the opposite ends of the anchor member to the supporting rim, said means including an internally threaded sleeve positioned in each end of the supporting rim structure, the open ends of said sleeves adapted to register with openings formed in the opposite ends of said anchor member, threaded bolts extending through said openings and engaging the threads in said sleeves, an adjustable spoke structure coacting with the hub and removable rim section, said structure including adjustable coacting spoke sections, the free end of one section being connected to the hub member and the free end of the other section being swivelly connected to said anchor member, said swivel connection being such that said removable rim section will move as a unit with said swivelly connected spoke section, means fixedly secured to said swivelly connected section for effecting relative adjustment of said sections to move said rim into and out of tire tightening position, and means operable to lock the spoke sections in tire tightening position, whereby a strong wheel structure is provided and the ready removal and replacement of the tire is effected.

JAMES M. LITTLE.